(12) United States Patent
Kim (10) Patent No.: US 8,742,898 B2
(45) Date of Patent: *Jun. 3, 2014

(54) APPARATUS FOR REMOVING TRANSMISSION LEAKAGE SIGNAL IN RFID SYSTEM AND RFID SYSTEM HAVING THE SAME

(75) Inventor: Yeong Chan Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 273 days.

This patent is subject to a terminal disclaimer.

(21) Appl. No.: 13/103,929

(22) Filed: May 9, 2011

(65) Prior Publication Data

US 2011/0285508 A1 Nov. 24, 2011

(30) Foreign Application Priority Data

May 18, 2010 (KR) ........................ 10-2010-0046665

(51) Int. Cl.
*H04Q 5/22* (2006.01)
*G08B 13/14* (2006.01)
*H04B 1/00* (2006.01)
*H04B 1/06* (2006.01)
*H04B 1/16* (2006.01)
*H04B 1/18* (2006.01)

(52) U.S. Cl.
USPC ..... 340/10.3; 340/10.1; 340/572.1; 455/63.1; 455/277.2; 455/284; 455/334

(58) Field of Classification Search
USPC .................. 455/63.1, 78–86, 214, 277.2, 284, 455/334–340
See application file for complete search history.

(56) References Cited

U.S. PATENT DOCUMENTS 5,995,019 A * 11/1999 Chieu et al. ................ 340/10.32

(Continued)

FOREIGN PATENT DOCUMENTS

CN 101647205 2/2010
JP 08-122429 5/1996

(Continued)

OTHER PUBLICATIONS

The State Intellectual Property Office of the People's Republic of China Application Serial No. 201110135225.4, Office Action dated Jun. 27, 2013, 10 pages.

(Continued)

*Primary Examiner* — Benjamin C Lee
*Assistant Examiner* — Adam Carlson
(74) *Attorney, Agent, or Firm* — Lee, Hong, Degerman, Kang & Waimey (57) ABSTRACT

Disclosed is an apparatus for removing a transmission leakage signal of an RFID system including a reader controller that sends a transmission signal to an RFID tag and receives a receiving signal transmitted from the RFID tag to read tag information, the apparatus including a leakage signal canceller that receives a portion of the transmission signal and the receiving signal, and performs an adjustment task to generate a cancellation signal according to an adjustment value to remove a transmission leakage signal and the portion of the transmission signal, and to remove the transmission leakage signal included in the receiving signal and a controller that continuously determines whether there is a change of an RF environment using an intensity of the receiving signal, the RFID tag being installed in the RF environment, and controls an operation of the leakage signal canceller according to the change of the RF environment.

14 Claims, 5 Drawing Sheets

(56) References Cited

U.S. PATENT DOCUMENTS

| | | | |
|---|---|---|---|
| 8,410,905 B2* | 4/2013 | Song et al. | 340/10.1 |
| 2006/0049250 A1* | 3/2006 | Sullivan | 235/385 |
| 2006/0198429 A1 | 9/2006 | Huang et al. | |
| 2006/0252398 A1* | 11/2006 | Park et al. | 455/296 |
| 2007/0072567 A1* | 3/2007 | Nagai et al. | 455/205 |
| 2007/0194886 A1* | 8/2007 | Bang et al. | 340/10.1 |
| 2008/0079547 A1* | 4/2008 | Alicot et al. | 340/10.3 |
| 2009/0015378 A1 | 1/2009 | Song et al. | |
| 2009/0068957 A1* | 3/2009 | Koo et al. | 455/67.14 |
| 2011/0279234 A1* | 11/2011 | Kim | 340/10.1 |

FOREIGN PATENT DOCUMENTS

| | | |
|---|---|---|
| JP | 09-186626 | 7/1997 |
| JP | 10-062518 | 3/1998 |
| JP | 11-308143 | 11/1999 |
| JP | 2000-134131 | 5/2000 |
| JP | 2007-189338 | 7/2007 |
| JP | 2008-147934 | 6/2008 |
| JP | 2009-526442 | 7/2009 |
| JP | 2010-505190 | 2/2010 |
| JP | 2010-102530 | 5/2010 |
| KR | 10-2009-0047873 | 5/2009 |

OTHER PUBLICATIONS

Korean Intellectual Property Office Application Serial No. 10-2010-0046665, Office Action dated Sep. 30, 2013, 5 pages.

* cited by examiner

APPARATUS FOR REMOVING TRANSMISSION LEAKAGE SIGNAL IN RFID SYSTEM AND RFID SYSTEM HAVING THE SAME

Pursuant to 35 U.S.C. §119 (a), this application claims the benefit of earlier filing date and right of priority to Korean Patent Application No. 10-2010-0046665, filed on May 18, 2010, the contents of which are hereby incorporated by reference in their entirety.

BACKGROUND OF THE DISCLOSURE

1. Field of the Invention

The present disclosure relates to an apparatus for removing a transmission leakage signal of an RFID system, capable of removing a transmission leakage signal in a Radio Frequency Identification (referred to as 'RFID', hereinafter) system, and an RFID system having the same.

2. Description of the Related Art

Generally, an RFID system is widely used in a system for transmitting and receiving information in a variety of fields such as approval management, document management, distribution management, identification and radio authentication, which includes a plurality of tags on which tag information is recorded and a reader to read tag information included in the tag.

The plurality of tags that exist in the same radio frequency field in such an RFID system are activated by the reader, the tags transmit their own tag information to the reader so that there occurs a collision among a plurality of tag information.

Accordingly, in order to solve the above described problem, the reader periodically transmits an anti-collision period that is a time when each tag can send the tag information, so as to prevent the plurality of tag information from colliding among them.

Meanwhile, in order to isolate a transmission signal from a receiving signal in an RFID system in which a radio signal is transmitted and received together, a separate isolation device such as an isolator is used.

Since there occurs a phenomenon in which the reader cannot receive a receiving signal well due to the fact that a portion of a transmission signal is leaked and mixed into the receiving signal while the transmission signal is transmitted and a receiving signal is received, the reader includes a separate leakage canceller to cancel such a transmission leakage signal, so that it performs an adjustment task to generate a cancellation signal.

However, while a set condition of the leakage signal canceller should be changed to cancel the transmission leakage signal that changes according to an RF environment when an RF environment having tags installed therein changes, a reader controller to control a reader in the RFID system in the art is engaged only in a task to read the tag during an anti-collision period so that there occurs a problem that the set condition cannot be changed according to a change of the RF environment.

Further, there was a limitation to suitably counteract a market requirement according to the change of RF environment since it is difficult to change a setting condition of a transmission leakage canceller to a new RF environment in an anti-collision period with the reader controller in the art, and it is not easy to correctly read tag information.

SUMMARY OF THE INVENTION

The present disclosure provides an apparatus for removing a transmission leakage signal of an RFID system, capable of performing a function to read an RFID tag and a function to adjust a leakage signal canceller to remove a transmission leakage signal, independently.

Further, the present disclosure provides an apparatus for removing a transmission leakage signal of an RFID system, capable of readjusting a leakage signal canceller according to a change of an RF environment and removing a transmission leakage signal, even in an anti-collision period.

According to an aspect of the present disclosure, there is provided an apparatus for removing a transmission leakage signal of an RFID system including a reader controller that sends a transmission signal to an RFID tag and receives a receiving signal transmitted from the RFID tag to read tag information, the apparatus including a leakage signal canceller that receives a portion of the transmission signal and the receiving signal, and performs an adjustment task to generate a cancellation signal according to an adjustment value to remove a transmission leakage signal and the portion of the transmission signal, and to remove the transmission leakage signal included in the receiving signal; and a controller that continuously determines whether there is a change of an RF environment using an intensity of the receiving signal, the RFID tag being installed in the RF environment, and controls an operation of the leakage signal canceller according to the change of the RF environment.

According to an embodiment of the present disclosure, the controller continuously compares the intensity of the receiving signal with a reference value, and determines that there is a change in the RF environment when the intensity of the receiving signal is equal to or greater than the reference value.

According to an embodiment of the present disclosure, the controller detects an adjustment value that makes the intensity of the receiving signal less than the reference value and transfers the adjustment value to the leakage signal canceller when it is determined that there is a change in the RF environment, and the leakage signal canceller performs an adjustment task to generate a cancellation signal according to the adjustment value transferred and remove the transmission leakage signal included in the receiving signal.

According to an embodiment of the present disclosure, the cancellation signal has the same amplitude and the opposite phase as the transmission leakage signal.

According to an embodiment of the present disclosure, the controller continuously determines whether the RF environment is changed even in an anti-collision period that is set by the reader controller according to a predetermined period, the RFID tag being installed in the RF environment.

According to an embodiment of the present disclosure, the apparatus may further include a divider that divides a portion of the transmission signal and outputs a divided signal.

According to an embodiment of the present disclosure, the leakage signal canceller includes a first leakage signal canceller that performs an adjustment task to generate a cancellation signal according to the adjustment value and cancel the transmission leakage signal included in the receiving signal; and a second leakage signal canceller that outputs the receiving signal to the controller, after the adjustment task to generate the cancellation signal according to the adjustment value and cancel the transmission leakage signal included in the receiving signal.

According to an embodiment of the present disclosure, the controller determines whether the intensity of the receiving signal inputted from the second leakage signal canceller is equal to or greater than a reference value, redetects the adjustment value and applies the adjustment value to the second leakage signal canceller when the intensity of the receiving signal is equal to or greater than the reference signal, repeatedly performs the determination and application processes until the intensity of the receiving signal becomes less than the reference value, and when the intensity of the receiving signal becomes less than the reference signal, applies an adjustment value corresponding to the intensity of the receiving signal to the first leakage signal canceller.

According to an embodiment of the present disclosure, the controller controls an operation time of the leakage signal canceller according to an on/off control signal inputted from the reader controller.

According to an embodiment of the present disclosure, the controller confirms whether there is a change in the RF environment when the on control signal is input from the reader controller, the RFID tag being installed in the RF environment, and controls an operation of the leakage signal canceller according to the change of the RF environment.

According to another aspect of the present disclosure, there is provided an RFID system including a reader controller that sends a transmission signal to an RFID tag and receives a receiving signal transmitted from the RFID tag to read tag information, and a transmission leakage signal removing module that removes a transmission leakage signal mixed into the receiving signal, wherein the transmission leakage signal removing module may comprise a leakage signal canceller that receives a portion of the transmission signal and the receiving signal, and performs an adjustment task to generate a cancellation signal according to an adjustment value to remove a transmission leakage signal and the portion of the transmission signal, and to remove the transmission leakage signal included in the receiving signal; and a controller that continuously determines whether there is a change of an RF environment using an intensity of the receiving signal, the RFID tag being installed in the RF environment, and controls an operation of the leakage signal canceller according to the change of the RF environment.

According to an embodiment of the present disclosure, the controller continuously compares the intensity of the receiving signal with a reference value, and determines that there is a change in the RF environment when the intensity of the receiving signal is equal to or greater than the reference value.

According to an embodiment of the present disclosure, the controller detects an adjustment value that makes the intensity of the receiving signal less than the reference value and transfers the adjustment value to the leakage signal canceller when it is determined that there is a change in the RF environment, and the leakage signal canceller performs an adjustment task to generate a cancellation signal according to the adjustment value transferred and remove the transmission leakage signal included in the receiving signal.

According to an embodiment of the present disclosure, the controller continuously determines whether the RF environment is changed even in an anti-collision period that is set by the reader controller according to a predetermined period, the RFID tag being installed in the RF environment.

According to an embodiment of the present disclosure, the apparatus may further include a divider that divides a portion of the transmission signal and outputs a divided signal.

According to an embodiment of the present disclosure, the leakage signal canceller includes a first leakage signal canceller that performs an adjustment task to generate a cancellation signal according to the adjustment value and cancel the transmission leakage signal included in the receiving signal; and a second leakage signal canceller that outputs the receiving signal to the controller, after the adjustment task to generate the cancellation signal according to the adjustment value and cancel the transmission leakage signal included in the receiving signal.

According to an embodiment of the present disclosure, the controller determines whether the intensity of the receiving signal inputted from the second leakage signal canceller is equal to or greater than a reference value, redetects the adjustment value and applies the adjustment value to the second leakage signal canceller when the intensity of the receiving signal is equal to or greater than the reference signal, repeatedly performs the determination and application processes until the intensity of the receiving signal becomes less than the reference value, and when the intensity of the receiving signal becomes less than the reference signal, applies an adjustment value corresponding to the intensity of the receiving signal to the first leakage signal canceller.

According to an embodiment of the present disclosure, the controller controls an operation time of the leakage signal canceller according to an on/off control signal inputted from the reader controller.

According to an embodiment of the present disclosure, the controller confirms whether there is a change in the RF environment when the on control signal is input from the reader controller, the RFID tag being installed in the RF environment, and controls an operation of the leakage signal canceller according to the change of the RF environment.

The RFID system according to the present disclosure has an advantageous effect in that a transmission leakage signal included in the receiving signal is removed more effectively when a transmission and a reception are performed together in an RFID system so that a receive sensitivity can be enhanced and a tag reading can be performed more precisely.

The RFID system according to the present disclosure has another advantageous effect in that it is possible to enhance a reliability of both functions by independently performing a function to read a tag and a function to remove a transmission leakage signal in an RFID system.

The RFID system according to the present disclosure has another advantageous effect in that it is possible to use a cheap CPU and accordingly enhance a competitiveness of product in price since a reader controller is wholly charged for reading a tag only.

The RFID system according to the present disclosure has another advantageous effect in that a transmission leakage signal can be efficiently removed by readjusting a leakage signal canceller according to a change of an RF environment even in an anti-collision period in the RFID system.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE PREFERRED EMBODIMENTS

Hereinafter, a preferred embodiment of the present disclosure will be described with reference to the accompanying drawings. Further, when it is determined that a detailed explanation of known function or construction related when describing the present disclosure unnecessarily obscures the gist of the present disclosure, its detailed description will be omitted.

Figure 1:
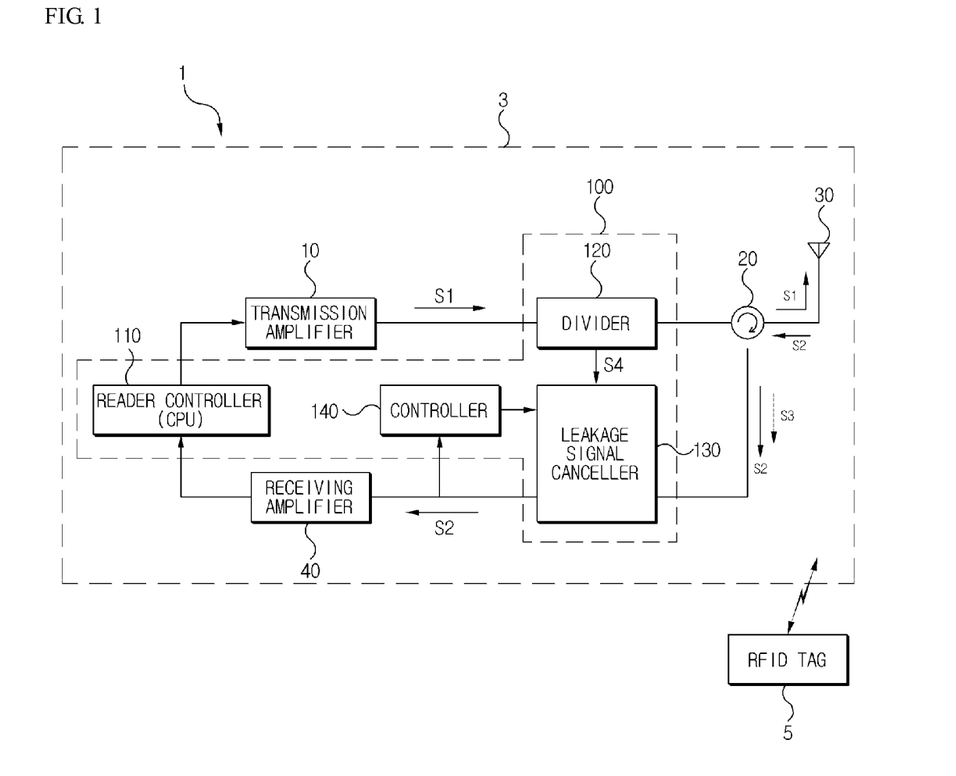
FIG. 1 is a block diagram illustrating a construction of an apparatus for removing a transmission leakage signal of an RFID system according to a first embodiment of the present disclosure.

FIG. 1 is a block diagram illustrating a construction of an apparatus for removing a transmission leakage signal of an RFID system according to a first embodiment of the present disclosure.

Referring to FIG. 1, the apparatus 100 for removing a transmission leakage signal of the RFID system 1 is constructed of a reader controller 110, a divider 120, a leakage signal canceller 130, and a controller 140.

The RFID system 1 is generally constructed of an RFID reader 3 and an RFID tag 5. The RFID reader 3 includes the apparatus 100 for removing a transmission leakage signal, which identifies tag information stored in the RFID tag 5 by transmitting and receiving RF signal to and from the RFID tag 5.

For this, the RFID reader 3 outputs a transmission signal S1 so as to send it to the RFID tag 5, and receives a receiving signal S2 sent from the RFID tag 5 so as to read tag information of the RFID tag 5.

The reader controller (CPU) 110 is a microcomputer that generally controls the RFID reader 3, outputting the transmission signal S1 to be sent to the RFID tag 5. The transmission signal S1 is amplified by the transmission amplifier 10 and radiated through an antenna 30 by way of the divider 120 and the isolator 20.

Further, the reader controller (CPU)(110) receives the receiving signal S2 through the antenna 30 and reads tag information of the RFID tag 5. At this time, the receiving signal S2 received through the antenna 30 is transferred to a receiving amplifier 40 by the isolator 20, and the receiving amplifier 40 amplifies the receiving signal S2 and then transmits it to the reader controller 110.

Further, the reader controller 110 periodically sets an anti-collision period in which a relevant receiving signal S2 can be sent from each RFID tag 5 in order to prevent a collision from occurring among a plurality of tag information (that is, a plurality of receiving signals sent from the RFID tag 5).

Then, each RFID tag 5 sends the receiving signal S2 at the anti-collision period.

Meanwhile, there occurs a phenomenon that a portion of the transmission signal S1 is leaked so that the transmission leakage signal S3 is mixed into the receiving signal S3 while the transmission signal S1 is sent and the receiving signal S2 is received.

As such, in order to cancel the transmission leakage signal S3 mixed into the receiving signal S2, the divider 120 outputs the divided signal S4 that is a portion of the transmission signal S1 branched, to the leakage signal canceller 130.

The leakage signal canceller 130 receive the divided signal S4 output from the divider 120 and the receiving signal S2, generates a cancellation signal and couples it with the receiving signal S2 (in which the transmission leakage signal S3 is mixed) in order to cancel the transmission leakage signal S3 included in the receiving signal S2 according to a control of the controller 140.

By doing this, the transmission leakage signal S3 included in the receiving signal S2 is cancelled by the cancellation signal so that only a pure receiving signal S2 is transferred to the receiving amplifier 40.

The leakage signal canceller 130 generates a cancellation signal on the basis of the divided signal S4 that is divided from the transmission signal S1. At this time, the cancellation signal has the same amplitude and the opposite phase as the transmission leakage signal S3.

If describing the above in more detail, in the state that an adjustment condition to remove the transmission leakage signal S3 is set in advance in the leakage signal canceller 130, an adjustment task to remove the transmission leakage signal S3 is performed when the leakage signal canceller 130 receives the divided signal S4 and the receiving signal S2, resets the adjustment condition according to an adjustment value when the adjustment value is transferred from the controller 140 and generates a cancellation signal according to the reset adjustment condition.

For this, the controller 140 performs an operation to search and detect an adjustment value used to prevent the transmission signal S1 from being mixed into the receiving signal S2 as much as possible, among the adjustment values.

Here, the adjustment value is a value that is set in the leakage signal canceller 130 to remove the transmission leakage signal S3 mixed into the receiving signal S2, which can make the receiving signal as less as possible in order to prevent the transmission signal S1 from being mixed into the receiving signal S2 (that is, in order that the transmission signal S1 affects the receiving signal as less as possible).

The controller 140 is a means that operates separately from the reader controller 110, that is, operates independently from the reader controller 110, which controls an operation of the leakage signal canceller 130 to remove the transmission leakage signal S3 mixed into the receiving signal S2.

In more detail, the controller 140 receives the receiving signal S2 from the RFID tag 5 in the RF environment, and confirms whether there is a change of the RF environment for the RF tag 5 using the intensity of the receiving signal S2.

Here, the change of the RF environment means that the size and number of the RFID 5 are changed or the position of the RFID 5 is changed, which can be confirmed using the intensity of the receiving signal sent from the RFID tag 5 in the RF environment or the like.

Further, when there is a change of the RF environment, the controller 140 redetect an adjustment value to remove the transmission leakage signal S3 caused according to the change of the RF environment, and resets the adjustment condition by applying the redetected adjustment value to the leakage signal canceller 130, so that the controller 140 can perform the adjustment task again to generate the cancellation signal using the leakage signal canceller 130.

Meanwhile, the controller 140 detects the adjustment value by finding the minimum value of the intensity of the receiving signal S2, that is, the amount of the receiving signal S2, zero (0).

In more detail, since the transmission leakage signal S3 is removed from the receiving signal S2 already when it passes through the leakage signal canceller 130, the intensity of the receiving signal S2 approximates to the minimum value, zero (0). However, since the intensity of the receiving signal S2 becomes high when the RF environment is changed even though passing through the leakage signal canceller 130 (that is, the intensity of the receiving signal is equal to or greater than a reference value), the controller 140 should perform an adjustment task for this according to a change of the RF environment.

Accordingly, the controller 140 redetects an adjustment value to make the intensity of the receiving signal S2 minimum, and applies the redetected adjustment value to the leakage signal canceller 130, so that the intensity of the receiving signal S2 has the minimum value (that is, a value less than a reference value) even when the adjustment condition is changed and the RF environment is changed.

Here, the redetected adjustment value means an adjustment value detected as a result of searching an adjustment value in order that the minimum intensity of the receiving signal is found among the plurality of the adjustment values that are already stored in the controller 140.

In order to detect the adjustment value, the intensity of the receiving signal should be checked when the RFID reader 3 is operated.

As such, it is possible to enable the leakage signal canceller 130 to make an adjustment task quickly by making the intensity of the receiving signal S2 checked always and the controller 140 operated separately from the reader controller 110 to make a readjustment when the intensity of the receiving signal S2 becomes higher.

Meanwhile, the controller 140 enables the leakage signal canceller 130 to perform an adjustment task when the RF environment changes even in an anti-collision period.

As described above, the function to read the tag is performed in the reader controller 110 and the function to control the leakage signal canceller 130 according to the change of the RF environment is performed in the controller 140, so that it is possible to efficiently remove the transmission leakage signal according to the change of the RF environment even in the anti-collision period and accordingly to meet the change of the RF environment promptly and reduce the load of the reader controller 110.

Figure 2:
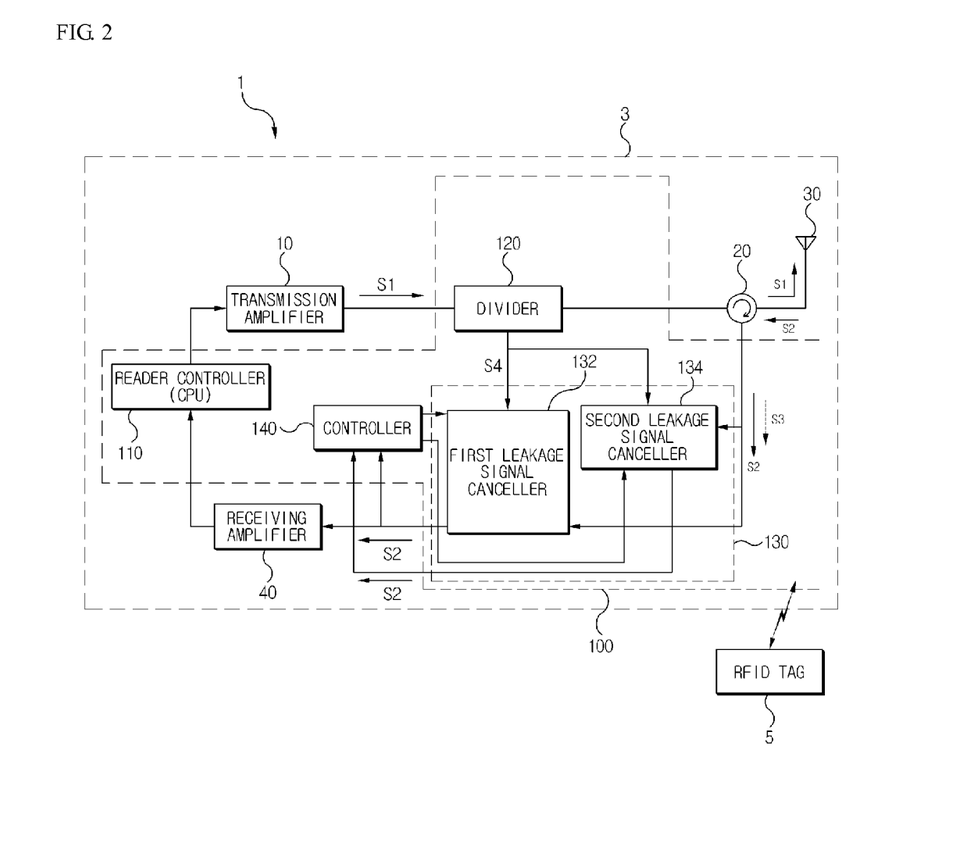
FIG. 2 is a block diagram illustrating a construction of an apparatus for removing a transmission leakage signal of an RFID system according to a second embodiment of the present disclosure.

FIG. 2 is a block diagram illustrating a construction of an apparatus for removing a transmission leakage signal of an RFID system according to a second embodiment of the present disclosure.

Referring to FIG. 2, an apparatus 100 for removing a transmission leakage signal of an RFID system 1 is constructed of a reader controller 110, a divider 120, a first leakage signal canceller 132, a second leakage signal canceller 134 and a controller 140.

Hereinafter, since the same function was described in the first embodiment, its description will be omitted.

The first leakage signal canceller 132 receives the divided signal S4 and the receiving signal 132 in the state that an adjustment condition was set already, resets an adjustment condition according to an adjustment value transferred from the controller 140, and generates a cancellation signal according to the reset adjustment condition, so that it performs an adjustment task to remove the transmission leakage signal S3.

The second leakage signal canceller 134 sets an adjustment condition by applying the adjustment value transferred from the controller 140, generates a cancellation signal to cancel the transmission leakage signal S3 included in the receiving signal S2 according to the set adjustment condition, performs an adjustment task to remove the transmission leakage signal using the cancellation signal, and outputs the receiving signal S2 from which the leakage signal is removed, to the controller 140.

The controller 140 determines whether an adjustment task to cancel the cancellation leakage signal S3 is properly performed using the receiving signal S2 output from the second leakage signal canceller 134 (that is, whether the intensity of the receiving signal S2 is minimum), and enables the first leakage signal canceller 132 to perform an adjustment task to remove the transmission leakage signal S3 by applying a relevant adjustment value to the first leakage signal canceller 132 when the adjustment task was properly performed.

If the adjustment task to cancel the transmission leakage signal S3 was not properly performed, the controller 140 redetects the adjustment value to apply it to the second leakage signal canceller 134, and the second leakage signal canceller 134 repeats a procedure to perform the adjustment task again using the redetected adjustment value and outputs the receiving signal S2 again that is output as a result of performing the adjustment task, so that a task to detect the optimum adjustment value is performed.

As such, the second leakage signal canceller 134 is used to detect an adjustment value to make the intensity of the receiving signal S2 minimum, so that an operation time can be reduced compared with when one leakage signal canceller 130 is used.

Further, the controller 140 performs a readjustment task of the leakage signal canceller 130 when there is a change of the RF environment even in the anti-collision period.

Meanwhile, in an embodiment of the present disclosure, the reader controller 110 may be constructed to control an operation time of the controller 140.

Figure 3:
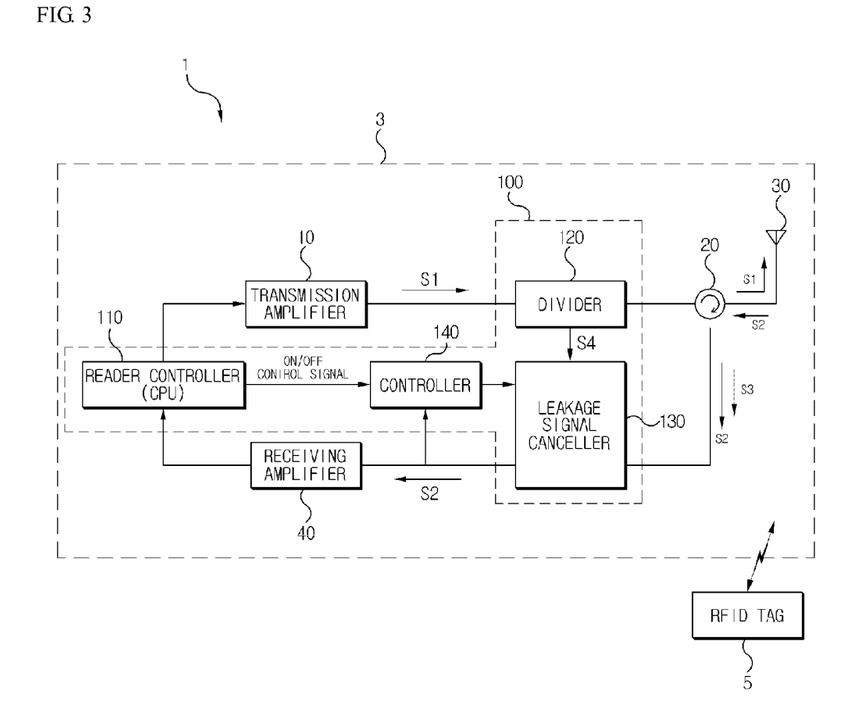
FIG. 3 is a block diagram illustrating a construction of an apparatus for removing a transmission leakage signal of an RFID system according to a third embodiment of the present disclosure.

FIG. 3 is a block diagram illustrating a construction of an apparatus for removing a transmission leakage signal of an RFID system according to a third embodiment of the present disclosure.

Referring to FIG. 3, an apparatus 100 for removing the transmission leakage signal of an RFID system 1 is constructed of a reader controller 110, a divider 120, a leakage signal canceller 130 and a controller 140.

Hereinafter, the construction having the same function will be omitted since it was described in the first and second embodiments.

A reader controller 110 is a microcomputer that generally controls the RFID reader, which also performs functions to output the transmission signal S1 to be sent to the RFID tag 5 and to control an operation of the controller 140 using on/off control signal in order to determine an operation point of the leakage signal canceller 130 in addition to a function to read information of the RFID tag 5.

In more detail, when the reader controller 110 outputs an on control signal to the controller 140, the controller 140 controls to perform an adjustment task to search and detect an adjustment value and apply it to the leakage signal canceller 130, so that the leakage signal canceller 130 can generate a cancellation signal corresponding to the transmission leakage signal and remove the transmission leakage signal.

Meanwhile, when the reader controller 110 outputs an on control signal to the controller 140, the controller 140 controls to confirm whether there is a change of the RF environment and to perform a readjustment task in the leakage signal canceller 130 according to the RF environment when it is confirmed that there is a change of the RF environment.

As such, it is possible to control the operation of the leakage signal canceller 130 more precisely when the reader controller 110 determines an operation time of the leakage signal canceller 130.

Figure 4:
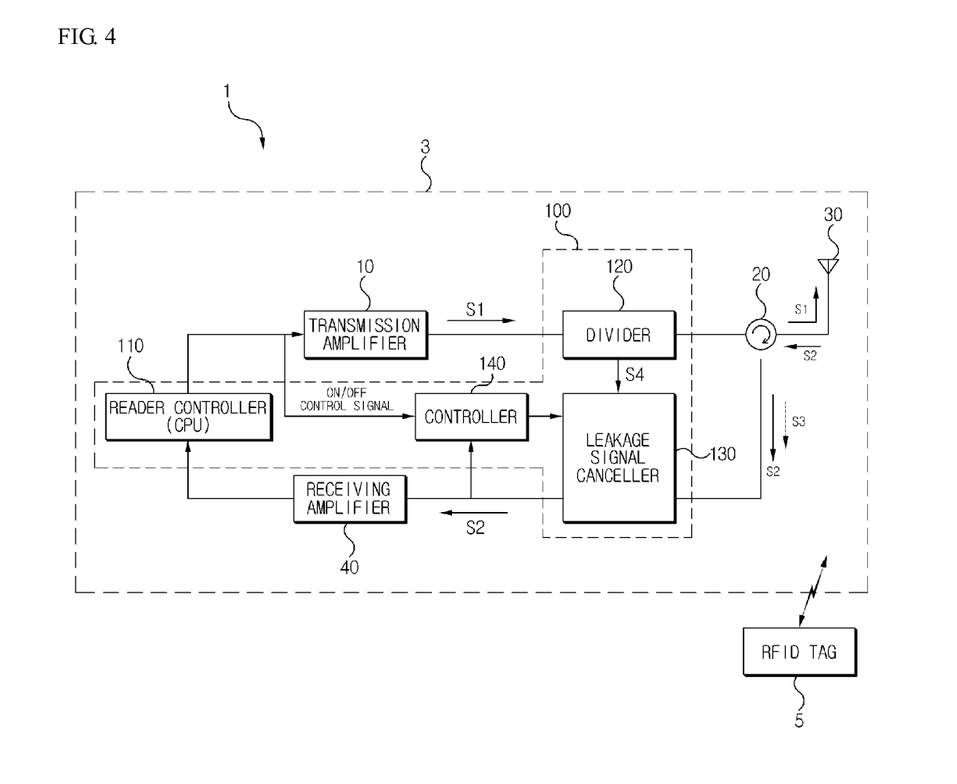
FIG. 4 is a block diagram illustrating a construction of an apparatus for removing a transmission leakage signal of an RFID system according to a fourth embodiment of the present disclosure.

FIG. 4 is a block diagram illustrating a construction of an apparatus for removing a transmission leakage signal of an RFID system according to a fourth embodiment of the present disclosure.

Referring to FIG. 4, an apparatus 100 for removing transmission leakage signal of the RFID system 1 is constructed of a reader controller 110, a divider 120, a leakage signal canceller 130 and a controller 140.

Hereinafter, the construction having the same function is omitted since it was described in the first to third embodiments.

The reader controller 110 is a microcomputer to generally control the RFID reader, which performs functions to output the transmission signal S1 to be sent to the RFID tag 5, read tag information of the RFID tag 5 and determine an operation time of the leakage signal canceller 130 additionally using a portion of the transmission signal S1 as on/off control signal.

In more detail, the reader controller 110 determines whether there is a change of the RF environment, and sends the transmission signal S1 when it is confirmed that the RF environment is changed. At this time, the reader controller 110 transfers a portion of the transmission signal S1 to the controller 140. Further, when the controller 140 receives the portion of the transmission signal S1, it searches and detects an adjustment value so as to apply it to the leakage signal canceller 130 so that the leakage signal canceller 130 can perform a readjustment task according to the change of the RF environment.

Meanwhile, when the reader controller 110 transmits the portion of the transmission signal S1 to the controller 140, the controller 140 confirms whether there is a change of the RF environment. When it is confirmed that there is a change of the RF environment, the controller searches and detects an adjustment according to the change of the RF environment so that the leakage signal canceller 130 can perform an adjustment task.

As described above, when the reader controller 110 sends the transmission signal S1, a portion of the transmission signal S1 is transferred to the controller 140 so that the adjustment value can be detected. Further, the leakage signal canceller 130 performs the adjustment task according to the adjustment value detected so that it is possible to control the operation of the leakage signal canceller 130 more precisely according to the change of the RF environment.

Additionally, the reader controller 110 can perform an operation to cancel the transmission leakage signal, and the controller 140 can perform a function to read the tag information according a control of the controller 110.

Further, it is possible to have a construction in which it includes a plurality of leakage signal cancellers and each leakage signal canceller performs an operation to cancel the transmission leakage signal according to an adjustment value.

Figure 5:
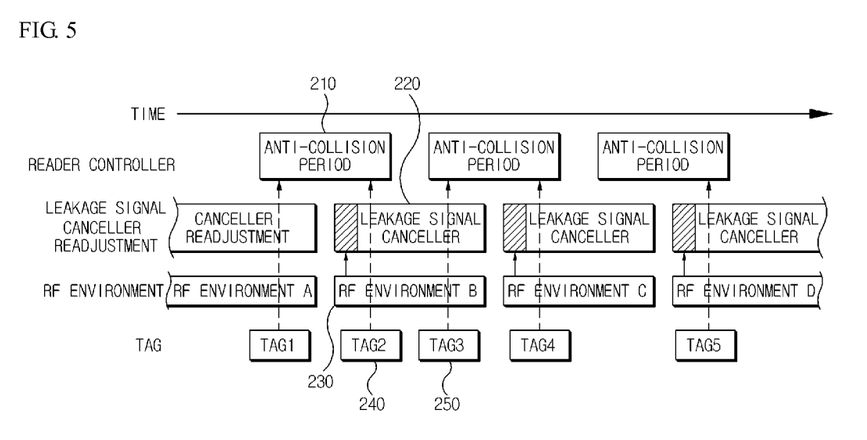
FIG. 5 is a time chart explaining a transmission leakage signal removal in an RFID system according to an embodiment of the present disclosure.

FIG. 5 is a time chart explaining a transmission leakage signal removal in an RFID system according to an embodiment of the present disclosure.

Referring to FIG. 5, in the RFID system according to the present disclosure, a reader controller 110 sets an anti-collision period 210 according to a period set in advance.

Each RFID tag 5 sends a receiving signal S2 to the RFID reader within each anti-collision period that is set as described above so that it is possible to prevent the plurality of receiving signals S2 from colliding among them.

At this time, the controller 140 continuously confirms whether there is a change of RF environment 230 with which the receiving signal is received from the plurality of the RFID tags, even in each anti-collision period.

It is for the purpose of detecting an adjustment value according to a change of the RF environment when there is a change of the RF environment and performing a readjustment task 220 in the leakage signal canceller 130.

Here, the readjustment task of the leakage signal canceller 130 is a task to cancel the transmission leakage signal S3 included in the tag signal that is received in the RFID reader, which refers to receiving a tag signal from a tag in the changed RF environment, generating a cancellation signal to cancel the transmission leakage signal S3 included in the tag signal and coupling the cancellation signal with the received tag signal.

The transmission leakage signal S3 included in the tag signal is removed because of the coupling so that a pure tag signal can be transferred.

At this time, an anti-collision period has several milliseconds to tens of seconds and there may be a situation in which the leakage signal canceller 130 may not perform the readjustment task during the anti-collision period and the reader may not receive the tag signal after an RF environment change when there occurs a change of the RE environment.

As such, it is possible to precisely identify tag information even when the RF environment changes by making the tag signal received from the tag that is in the changed RF environment when the RF environment around the tag even during the same anti-collision period.

Therefore, it is possible to precisely receive the tag signal from the tag that is in the changed RF environment by confirming the change of the RF environment according to a period set in advance and continuously performing an readjustment task of the leakage signal canceller 130 according to the change of the RF environment.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. An apparatus for removing a transmission leakage signal in an RFID system including a reader controller that sends a transmission signal to an RFID tag and receives a receiving signal from the RFID tag in order to read tag information, the apparatus comprising:
a leakage signal canceller that:
receives a portion of the transmission signal;
receives the receiving signal including a transmission leakage signal; and
performs an adjustment task of generating a cancellation signal according to an adjustment value and the portion of the transmission signal in order to remove the transmission leakage signal from the receiving signal;
a controller that:
continuously determines whether there is a change of an RF environment in which the RFID tag is installed by using an intensity of the receiving signal, the receiving signal directly received from the leakage signal canceller;
controls an operation of the leakage signal canceller by detecting the adjustment value that makes the intensity of the receiving signal less than a reference value, the adjustment detected according to the change of the RF environment;
transfers the adjustment value to the leakage signal canceller when it is determined that there is a change in the RF environment; and
controls an operation time of the leakage signal canceller according to an on or off control signal input via the reader controller, wherein the leakage signal canceller comprises:
  a first leakage signal canceller that performs a first instance of the adjustment task to generate the cancellation signal according to the adjustment value and cancels the transmission leakage signal included in the receiving signal; and
  a second leakage signal canceller that performs a second instance of the adjustment task and outputs the receiving signal without the transmission leakage signal to the controller after the second instance of the adjustment task is performed.

2. The apparatus according to claim 1, wherein the controller continuously compares the intensity of the receiving signal with the reference value, and determines that there is a change in the RF environment when the intensity of the receiving signal is equal to or greater than the reference value.

3. The apparatus according to claim 1, wherein the cancellation signal has a same amplitude and an opposite phase from the transmission leakage signal.

4. The apparatus according to claim 1, wherein the controller continuously determines whether the RF environment is changed even in an anti-collision period that is set by the reader controller according to a predetermined period.

5. The apparatus according to claim 1, further comprising a divider that divides a portion of the transmission signal and outputs a divided signal.

6. The apparatus according to claim 1, wherein the controller:
  repeatedly determines whether the intensity of the receiving signal received from the second leakage signal canceller is equal to or greater than a reference value, redetects the adjustment value and applies the adjustment value to the second leakage signal canceller when the intensity of the receiving signal is equal to or greater than the reference value; and
  applies the adjustment value corresponding to the intensity of the receiving signal to the first leakage signal canceller when the intensity of the receiving signal becomes less than the reference value.

7. The apparatus according to claim 1, wherein the controller confirms whether there is a change in the RF environment when the on control signal is input from the reader controller.

8. An RFID system including a reader controller and a transmission leakage signal removing module, the reader controller sending a transmission signal to an RFID tag and receiving a receiving signal transmitted from the RFID tag in order to read tag information, and the transmission leakage signal removing module removing a transmission leakage signal mixed into the receiving signal, wherein the transmission leakage signal removing module comprises:
  a leakage signal canceller that:
    receives a portion of the transmission signal and the receiving signal, the receiving signal including a transmission leakage signal; and
    performs an adjustment task of generating a cancellation signal according to an adjustment value and the portion of the transmission signal in order to remove the transmission leakage signal from the receiving signal;
  a controller that:
    continuously determines whether there is a change of an RF environment in which the RFID tag is installed by using an intensity of the receiving signal, the receiving signal which is directly received from the leakage signal canceller;
    controls an operation of the leakage signal canceller by detecting the adjustment value that makes the intensity of the receiving signal less than a reference value, the adjustment detected according to the change of the RF environment;
    transfers the adjustment value to the leakage signal canceller when it is determined that there is a change in the RF environment; and
    controls an operation time of the leakage signal canceller according to an on or off control signal input via the reader controller,
  wherein the leakage signal canceller comprises:
    a first leakage signal canceller that performs a first instance of the adjustment task to generate the cancellation signal; and
    a second leakage signal canceller that performs a second instance of the adjustment task and outputs the receiving signal without the transmission leakage signal to the controller after the second instance of the adjustment task is performed.

9. The RFID system according to claim 8, wherein the controller continuously compares the intensity of the receiving signal with the reference value, and determines that there is a change in the RF environment when the intensity of the receiving signal is equal to or greater than the reference value.

10. The RFID system according to claim 8, wherein the controller continuously determines whether the RF environment is changed even in an anti-collision period that is set by the reader controller according to a predetermined period.

11. The RFID system according to claim 8, further comprising a divider that divides a portion of the transmission signal and outputs a divided signal.

12. The RFID system according to claim 8, wherein the controller:
  repeatedly determines whether the intensity of the receiving signal received from the second leakage signal canceller is equal to or greater than a reference value, redetects the adjustment value and applies the adjustment value to the second leakage signal canceller when the intensity of the receiving signal is equal to or greater than the reference value:
  applies the adjustment value corresponding to the intensity of the receiving signal to the first leakage signal canceller when the intensity of the receiving signal becomes less than the reference value.

13. The RFID system according to claim 8, wherein the controller confirms whether there is a change in the RF environment when the on control signal is input from the reader controller.

14. The RFID system according to claim 8, wherein the cancellation signal has a same amplitude and an opposite phase from the transmission leakage signal.

* * * * *